(12) United States Patent
Tobias et al.

(10) Patent No.: US 11,322,882 B2
(45) Date of Patent: May 3, 2022

(54) SUBMERSIBLE CONNECTOR SEAL

(71) Applicant: The Johns Hopkins University, Baltimore, MD (US)

(72) Inventors: Ryan M. Tobias, Westminster, MD (US); Charles W. Kerechanin, II, Columbia, MD (US); Connor J. Ritmiller, Baltimore, MD (US); Richard R. Porter, Sparks Glencoe, MD (US)

(73) Assignee: The Johns Hopkins University, Baltimore, MD (US)

( * ) Notice: Subject to any disclaimer, the term of this patent is extended or adjusted under 35 U.S.C. 154(b) by 28 days.

(21) Appl. No.: 16/938,163

(22) Filed: Jul. 24, 2020

(65) Prior Publication Data

US 2021/0098933 A1 Apr. 1, 2021

Related U.S. Application Data

(60) Provisional application No. 62/907,126, filed on Sep. 27, 2019.

(51) Int. Cl.
| | |
|---|---|
| *H01R 13/523* | (2006.01) |
| *H01R 13/533* | (2006.01) |
| *H01R 43/00* | (2006.01) |
| *H02G 15/14* | (2006.01) |
| *H01R 13/52* | (2006.01) |

(52) U.S. Cl.
CPC ....... *H01R 13/523* (2013.01); *H01R 13/5219* (2013.01); *H01R 13/533* (2013.01); *H01R 43/005* (2013.01); *H02G 15/14* (2013.01)

(58) Field of Classification Search
CPC .......... H01R 13/523; H01R 13/5219; H01R 13/533; H01R 43/005; H02G 15/14
See application file for complete search history.

(56) References Cited

U.S. PATENT DOCUMENTS

| | | | |
|---|---|---|---|
| 2005/0037656 A1* | 2/2005 | Cairns ................ | H01R 13/5219 439/353 |
| 2005/0136722 A1* | 6/2005 | Cairns ................ | H01R 13/5219 439/271 |
| 2019/0067868 A1* | 2/2019 | Cairns ................ | H01R 13/5219 |

* cited by examiner

*Primary Examiner* — Tho D Ta
(74) *Attorney, Agent, or Firm* — Todd R. Farnsworth

(57) ABSTRACT

A connector seal for use in a submersible connection apparatus may include a shell comprising an internal channel and a groove disposed on an external surface of shell. The connector seal may also include an annular seal member disposed in the groove of the shell. The annular seal member may be configured to hermetically piston seal the connector seal within the submersible connection apparatus. The connector seal may also include a first interconnect disposed within the internal channel at a first end of the shell, a second interconnect disposed within the internal channel at a second end of the shell, a conductive pin configured to make an electrical connection through the connector seal. The conductive pin may extend between and disposed within the first interconnect and the second interconnect.

18 Claims, 9 Drawing Sheets

SUBMERSIBLE CONNECTOR SEAL

CROSS-REFERENCE TO RELATED APPLICATIONS

This application claims the benefit of U.S. Provisional Application No. 62/907,126 filed on Sep. 27, 2019, the entire contents of which are hereby incorporated herein by reference.

STATEMENT OF GOVERNMENTAL INTEREST

This invention was made with Government support under contract number HHM402-18-D-0002 awarded by the U.S. Government. The Government has certain rights in the invention.

TECHNICAL FIELD

Example embodiments generally relate to cable connection systems and, in particular, relate to sealing technology for undersea cable connection systems.

BACKGROUND

Undersea cabling provides an essential element to the communications infrastructure of our global communications network. Undersea cabling may span across rivers, oceans, or the like to bring connectivity between separated land masses, and undersea cabling may be used in more localized applications such as to lower sensors into the depths of an ocean for research and for undersea antenna connections. As with any type of cable system, undersea or underwater cable systems require that connection be made between components and cables. Cable connections may be necessary to increase a length of a cable run, to junction off of a cable in two or more directions, or to connect the cable to other components, such as an a antenna. Connection points are traditionally weak points in the cable system and are most susceptible to failure. Because sea water can be corrosive, if sea water penetrates into the cable connection, corrosion can occur at the connection and ultimately failure of the connection can occur. As such, seals are needed to protect connection points from the intrusion of sea water into the electrical connection points. While seal technology for such connections exists in some forms, there continues to be a need for improvements, particularly with respect to supporting high-frequency communications at high pressures (low depths). Moreover, there continues to be needs in the area of connectors and seals that support the propagation of high-frequency signals at low depths (high pressures) in a small form factor.

BRIEF SUMMARY OF SOME EXAMPLES

According to some example embodiments, a connector seal for use in a submersible connection apparatus is provided. The connector seal may comprise a shell comprising an internal channel and a groove disposed on an external surface of shell. The connector seal may further comprise an annular seal member disposed in the a groove of the shell. The annular seal member may be configured to hermetically piston seal the connector seal within the submersible connection apparatus. The connector seal may further comprise a first interconnect disposed within the internal channel at a first end of the shell, a second interconnect disposed within the internal channel at a second end of the shell, and a conductive pin configured to make an electrical connection through the connector seal. The conductive pin may extend between and be disposed within the first interconnect and the second interconnect.

According to some example embodiments, a submersible connection apparatus is provided. The submersible connection apparatus may comprise a cable comprising a conductor, a cable interconnect affixed to an end of the cable and electrically connected to the conductor, a cable potting cup comprising a potting cup internal channel, and a connector seal disposed within the potting cup internal channel. The connector seal may comprise a shell comprising an internal channel and a groove disposed on an external surface of shell with an annular seal member disposed in the groove of the shell. The annular seal member may be configured to hermetically piston seal the connector seal to an inner wall of the potting cup internal channel. The connector seal may further comprise a first interconnect disposed within the internal channel of the shell at a first end of the shell, a second interconnect disposed within the internal channel of the shell at a second end of the shell, and a conductive pin configured to make an electrical connection through the connector seal. The conductive pin may extend between and disposed within the first interconnect and the second interconnect. An electrical connection between the conductor of the cable and the conductive pin may be formed via a push-on connection between the cable interconnect and the first interconnect.

According to some example embodiments, a method for assembling a submersible connection is provided. The method may comprise affixing a cable interconnect to a conductor of a cable, affixing a cable potting cup to the cable, hermetically piston sealing a connector seal to an inner wall of an internal channel of the cable potting cup via an annular seal member disposed within a groove of the connector seal, and push connecting the cable interconnect with a first interconnect of the connector seal.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
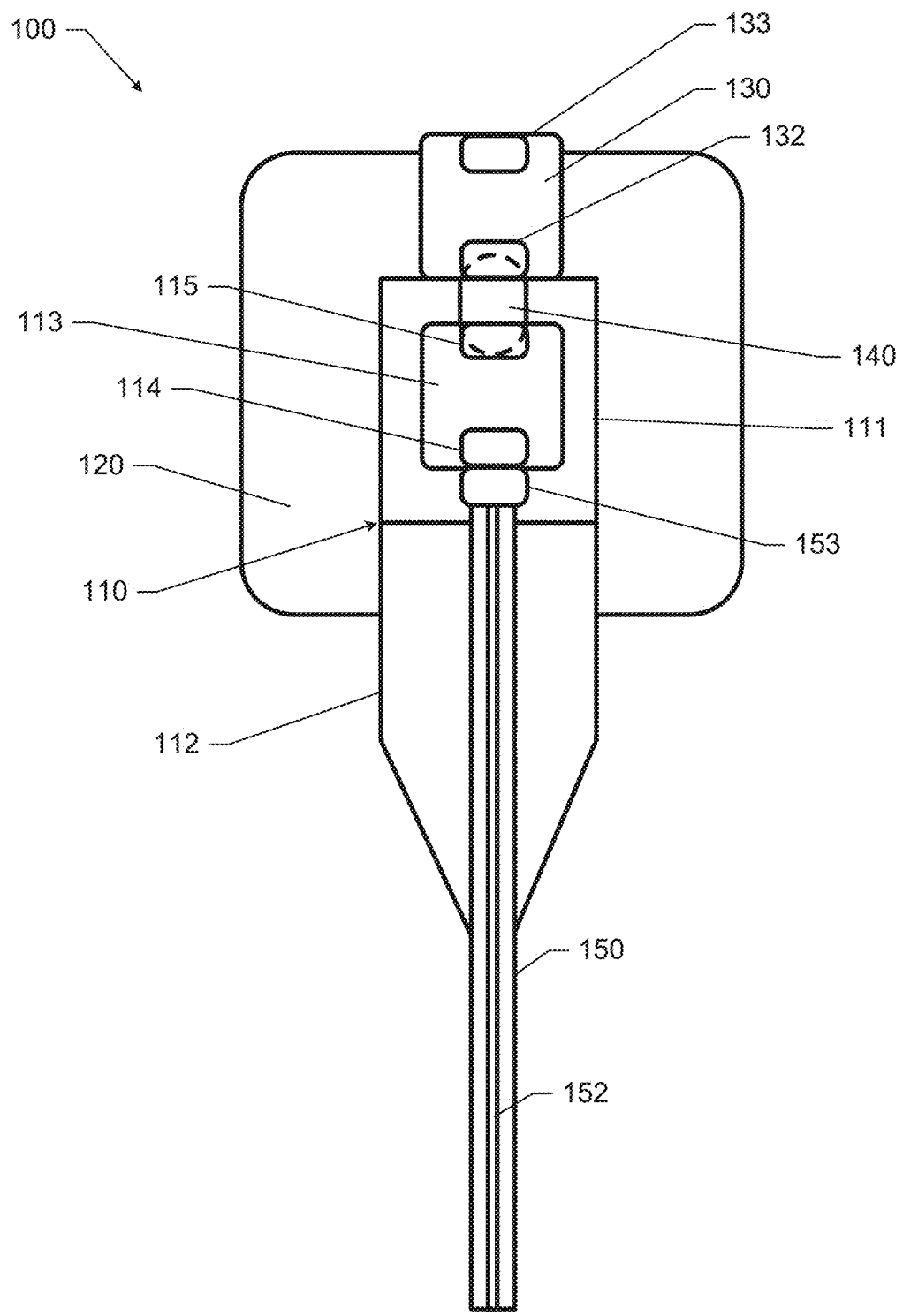
FIG. 1 is a diagram showing internal components of a submersible connection apparatus according to some example embodiments.

Some example embodiments will now be described more fully with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. The term "or" as used herein is defined as the logical or that is true if either or both are true.

According to some example embodiments, a connector seal is described that can be used in a variety of settings including in a submersible connection apparatus. The connector seal may operate as a barrier to prevent the intrusion of sea water or other fluids into internal chambers of a submersible connection apparatus where electrical connections can be made in an isolated setting to prevent corrosion. While operating as a barrier to the external environment, the connector seals, according to some example embodiments, also include components that support electrical connectivity that passes through the connector seal. Because the conductors that support the electrical connections are components of the connector seals themselves, the connector seals may be designed to have a structure, and use materials, that support the propagation of signals through the conductors of the connector seals without creating significant signal attenuation, particularly at high radio frequencies.

The connector seals described herein, according to some example embodiments, can operate as a barrier to high external pressures, such as pressures that may be experienced at sea depths of 1000 meters and even up to 6000 meters. Additionally, the connector seals, according to some example embodiments, may also support the propagation and transmission of signals at radio frequencies spanning from, for example, DC to 40 GHz. Further, these challenges can be met and exceeded by the example connector seals described herein that, according to some example embodiments, are sized at about one-half inch or less in diameter. Additionally, according to some example embodiments, the connector seals described herein may be utilized with cables (e.g., co-axial cables) having, for example, a 50 or 75 Ohm characteristic impedance.

According to some example embodiments, a connector seal may comprise a shell that forms an exterior structure of the connector seal. The shell may substantially cylindrical in shape with an internal channel. Additionally, the shell may comprise an external groove that is formed between external ribs and configured to receive and maintain an annular seal member (e.g., an o-ring). The annular seal member may be formed of an elastic or compressible material. As such, the annular seal member may be a primary component for forming a barrier between an external environment and an internal, isolated connection chamber. In this regard, the annular seal member may be compressed between the exterior of the shell of the connector seal and an internal channel of, for example, a cable potting cup of the connection apparatus or a bore wall of a pressure vessel, as further described below. The annular seal member may, according to some example embodiments, form a hermetic piston seal between the shell of the connector seal and the internal channel of the cable potting cup or the bore wall of the pressure vessel. A pressure vessel, according to some example embodiments, may be container that is configured to maintain an internal pressure, while withstanding external pressures, for example, due to ocean depths. As such, a pressure vessel may be a type of housing for the connector seal and the other components that form a cable connection.

A number of components may be disposed within the internal channel of the shell of the connector seal to support electrical connectivity through the connector seal. In this regard, the connector seal may comprise interconnect members (or interconnects) at each end of the shell. The interconnect members may be configured to mechanically support a dielectric sleeve and a conductive pin that may extend between and pass through the interconnect members, with the conductive pin being the component that forms the electrical connector to other connectors that would interface or engage with the connector seal. The interconnect members may also be formed as push-on connectors (e.g., sub miniature push-on (SMP) connectors) configured to require application of a detent force to interface with complementary push-on connectors to form an electrical connection through the connector seal. To support the propagation of signals through the conductive pin, the connector seal may include other electrical isolation components within the internal channel of the shell. In this regard, the conductive pin may pass through the dielectric sleeve that may be disposed within the internal channel of the shell between the interconnect members. The dielectric sleeve may electrically and physically isolate the conductive pin from the interconnect members. Additionally, to support further isolation of the conducive pin, the connector seal may comprise an isolator sleeve. The isolator sleeve may be disposed within the internal channel of the shell and may, in turn, have an internal channel. To isolate the conductive pin and the interconnect members from the shell, the interconnect members, the conductive pin, and the dielectric sleeve may be disposed within the internal channel of the isolator sleeve.

Having described general aspects of some example embodiments of a connector seal, FIG. 1 will now be described, which illustrates a context in which a connector seal may be implemented in the form of a submersible connection apparatus 100. The submersible connection apparatus 100 may comprise a cable potting apparatus 110 comprising a connector seal 113, a pressure vessel 120, a pressure vessel connector seal 130, a bullet connector 140, and a cable 150.

The cable 150 may comprise an internal conductor 152. The conductor 152 may be formed of a metal or other material with relatively high electrical conductivity. The cable 150 may be co-axial (coax) cable having, for example, a 50 or 75 characteristic impedance. The cable 150 may, according to some example embodiments, comprise a rigid or semi-rigid casing or cable jacket to inhibit or prevent deformations of the cable 150. Additionally, the cable 150 may include a solid dielectric disposed between the conductor 152 and the casing or cable jacket. According to some example embodiments, the cable 150 may be a cable constructed for subsea conditions. A cable interconnect 153 may be installed on an end of the cable 150 such that an electrical connection to the conductor 152 may be made available via the cable interconnect 153.

The cable potting apparatus 110 may comprise a cable potting cup 111, a support sheath 112, and a connector seal 113. The cable potting cup 111 may have internal cavity within which the connector seal 113 may be installed. As further described below, the connector seal 113 may be hermetically sealed into the cable potting cup 111. To hermetically seal the connector seal 113 to cable potting cup 111, the connector seal 113 may comprise one or more seal members that compress between an external shell of the connector seal 113 and the wall of the internal channel of the cable potting cup 111. Such seal members may be annular seal members in the form of, for example, radial or o-ring seals as further described below.

The cable 152 and the cable interconnect 153 may be received into a first end of the cable potting cup 111. The cable interconnect 153 of the cable 152 may be connected to an interconnect 114 of the connector seal 113 to form an electrical connection between the conductor 152 of the cable 150 and a conductive pin (not shown in FIG. 1) of the connector seal 113. The support sheath 112 may be affixed to the cable end (first end) of the cable potting cup 111. The support sheath 112 may operate to prevent the cable 150 from being bent beyond a threshold bending radius for the cable 150 due to engagement with the cable potting apparatus 110 and forces that may be applied to the cable 150 that may cause the cable 150 to bend at the interface with the cable potting cup 111 and the connector seal 113. As such, the support sheath 112 may be formed of a flexible material and may extend away from the cable potting cup 111 by a distance that prevents the bending radius of the cable 150 at the interface with the cable potting cup 111 from being exceeded by forces applied to the cable 150.

The connector seal 113 may comprise the interconnect 114 at a cable end of the connector seal and an interconnect 115 at an opposite, connection end of the connector seal 113. As mentioned above, the connection apparatus 100 may also include a pressure vessel connector seal 130 that comprises an interconnect 132 and an interconnect 133. The pressure vessel connector seal 130 may be the same or similar to the connector seal 113. The bullet connector 140 of the connection apparatus 100 may be a type of connection adapter and may be connected between the connector seal 113 and the pressure vessel connector seal 130. In this regard, as further described below with respect to FIG. 5, the bullet connector 140 may be configured to allow for radial or axial variations in the alignment between the connector seal 113 and the pressure vessel connector seal 130, while maintaining an electrical connection. In regard, the bullet connector 140 may include components that allow for slight pivoting or translation in relation with the interconnects 115 and 132 to support an electrical connection. The bullet connector 140 may be spring-loaded to apply a force to maintain high-quality electrical connections, after assembly of the connection apparatus, between the bullet connector 140 and the interconnect 115, as well as between the bullet connector 140 and the interconnect 132.

The interconnect 133 may be configured to interface with another cable or connector to form a connection with another connection apparatus or device. Further, the pressure vessel 120 may house the cable potting cup 111, the bullet connector 140, and the pressure vessel connector seal 130. As mentioned above, the pressure vessel 120, according to some example embodiments, may be container that is configured to maintain an internal pressure, while withstanding external pressures, for example, due to ocean depths. The pressure vessel 120 may be casted, forced, machined, or the like when constructed and may be designed with a bore or channel configured to receive the cable potting cup 111, the bullet connector 140, and the pressure vessel connector seal 130. In this regard, the cable potting apparatus 110 and the pressure vessel connector seal 130 may be disposed within the bore or channel of the pressure vessel 120. The pressure vessel 120 may encapsulate these components within the bore to offer further resistance to penetration of sea water or other fluids into the connection apparatus 100 and also provide structural support for maintaining the components in position relative to each other.

Figure 2A:
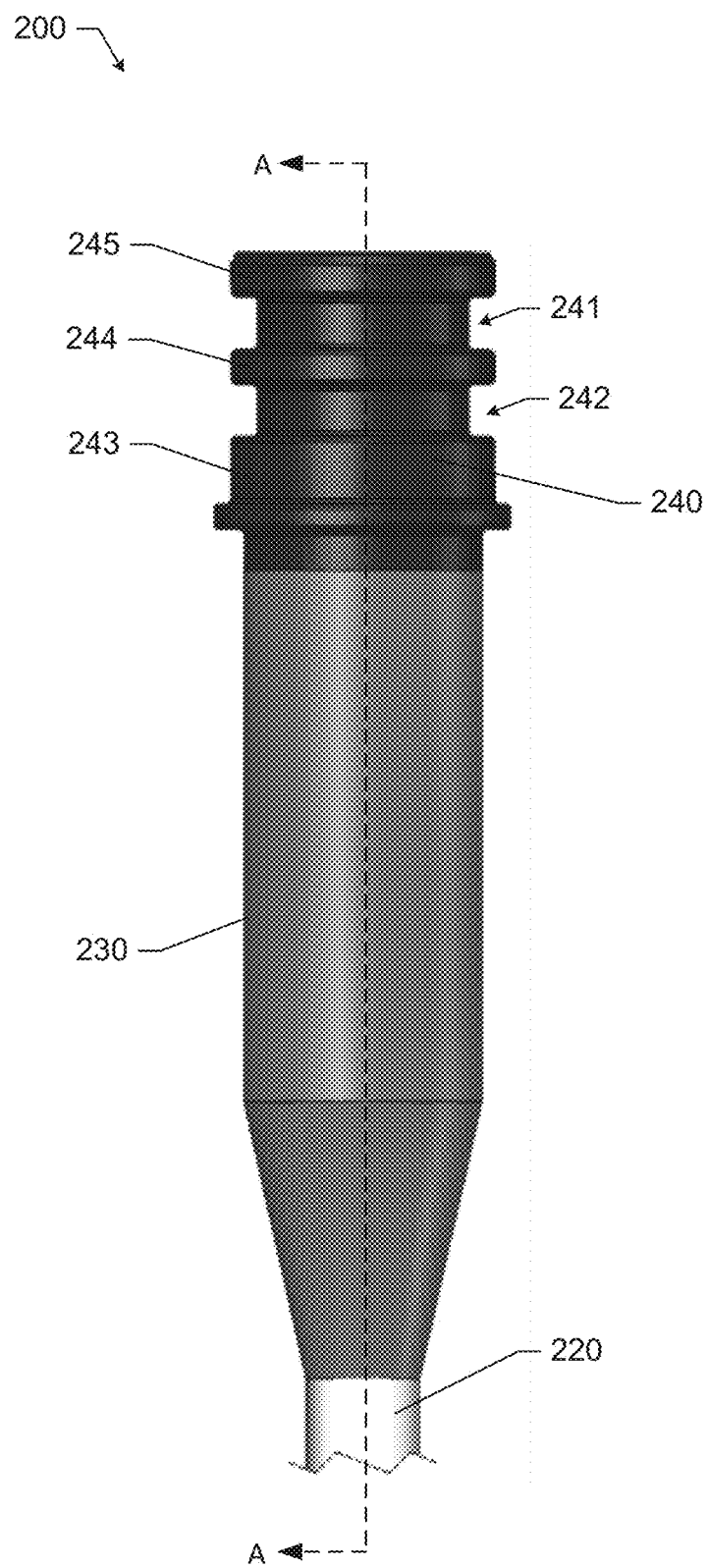
FIG. 2A is an external side view of a cable potting apparatus according to some example embodiments.

Having described an example connection apparatus according to some example embodiments, FIGS. 2A and 2B will now be described which illustrate an example embodiment of a cable potting apparatus 200. In this regard, the cable potting apparatus 200 may operate the same as or similar to the cable potting apparatus 110 described above. Referring specifically to FIG. 2A, an external side view of the cable potting apparatus 200 is shown. The cable potting apparatus 200 may comprise a support sheath 230, which may be a variation of the support sheath 112, and a cable potting cup 240, which may be a variation of the cable potting cup 111.

As such, the cable 220, which may be a coaxial cable having a central conductor, may connected to the cable potting apparatus 200 and may be coupled to at least the support sheath 230. As described above, the support sheath 230 may be formed of a flexible material (e.g., a rubber) that limits the bending of the cable 220 at the interface with the cable potting cup 240 and an internally disposed connector seal (not shown in FIG. 2A). The support sheath 230 may form a fluid-tight seal with the cable 220 and the cable potting cup 240. A length of the support sheath 230 along the cable 220 from the cable potting cup 240 may be a function of a minimum bend radius of the cable 220. For example, for a 0.215 diameter coaxial cable, the length of the sheath 230 may be 1.5 inches and may have a diameter of 0.45 inches with a tapered end (i.e., the end distal from the cable potting cup 240). According to some example embodiments, the support sheath 230 may be overmolded onto the cable potting cup 240 or the cable 220.

The cable potting cup 240 may be formed of, for example, a rigid material, such as aluminum or other non-corrosive rigid material. The cable potting cup 240 may be generally formed in a cylindrical shape with various features disposed within an internal channel of the cable potting cup 240, as well as on the external surfaces of the cable potting cup 240. With respect to the external surfaces, which may interface with a bore or internal channel in a pressure vessel (e.g., pressure vessel 120), one or more grooves may be disposed on the external surface of the cable potting cup 240. As shown in FIG. 2A, two grooves 241 and 242 may be disposed on the external surface of the cable potting cup 240. The groove 241 may be defined by protruding ribs 245 and 244, and the groove 242 may be defined by protruding ribs 244 and 243. Within these grooves 241 and 242, an annular seal member (not shown) may be disposed to seal the cable potting cup 240 to an internal surface of a bore within a pressure vessel.

Figure 2B:
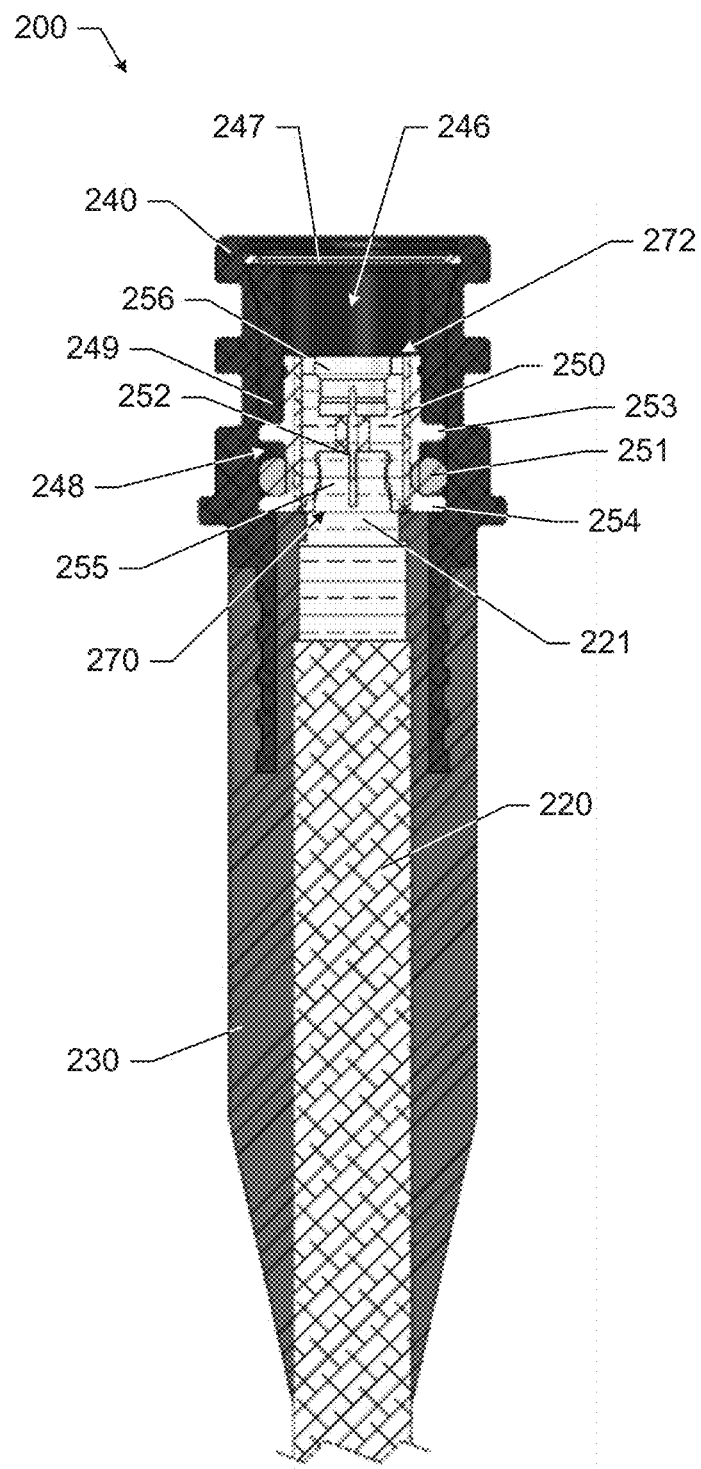
FIG. 2B is a cross-section side view of the cable potting apparatus of FIG. 2A taken at the plane defined at A-A according to some example embodiments.

Now referring to FIG. 2B, a cross-section side view of the cable potting apparatus 200 is provided showing the internal components. In this regard, the connector seal 250 in connection with an interconnect member 221 on the cable 220 is visible.

Accordingly, as mentioned above, the cable potting cup 240 may include an potting cup internal channel 246. The connector seal 250, which may be the same or similar to the connector seals 113 and 130 described above with regard to FIG. 1, may be disposed within the potting cup internal channel 246. The connector seal 250 may include ribs 253 and 254 disposed externally to the connector seal 250 that form a groove 248 between the ribs 253 and 254. According to some example embodiments, the rib 254 may be disposed at a first end 270 (lower end in FIG. 2B) of the connector seal 250, and the rib 253 may be disposed between the rib 254 and a second, opposite end 272 (upper end in FIG. 2B) of the connector seal 250.

An annular seal member 251 may be disposed in the groove 248 between the ribs 253 and 254. However, although FIG. 2B illustrates one annular seal member 251, it is understood that a plurality of annular seal members (e.g., including "back-up" seal members) may be either disposed in the groove 248 or in separately formed grooves with respective ribs on the exterior of the connector seal 250. The annular seal member 251 may be formed as, for example, a radial or o-ring seal member. The annular seal member 251 may be formed of an elastic material that may be compressed to form a barrier seal between two cavities. In this regard, for example, the annular seal member 251 may be formed of an ethylene propylene material or other synthetic elastomers. In this regard, the annular seal member 251 may, according to some example embodiments, be formed of M-class rubbers under the American Society of Test and Materials (ASTM) standards that have a saturated chain of polyethylene or polymethylene. According to some example embodiments, the annular seal member 251 may be formed of an ethylene propylene diene monomer rubber (EPDM).

Further, the annular seal member 251 may be compressed between an outer surface of the connector seal 250 between the ribs 253 and 254 and a wall of the potting cup internal channel 246. This compressed engagement between the outer surface of the connector seal 250 between the ribs 253 and 254, the annular seal member 251, and the wall of the potting cup internal channel 246 may form a hermetic seal between the connector seal 250 and the cable potting cup 240. Further, because the connector seal 250 may be slid into the potting cup internal channel 246, the engagement of the annular seal member 251 may be in the form of a piston seal between the connector seal 250 and the cable potting cup 240. The seal formed between the connector seal 250 and the cable potting cup 240 may be configured to maintain integrity (i.e., operate as a barrier to penetration of fluids) at pressures up to 1500 pounds per square inch or more, which may occur at ocean depths of, for example, 1000 meters or more. As such, the compression of the annular seal member 251 (e.g., piston seal approach) operates to create a barrier that permits the connector seal 250 to maintain integrity at such pressures. Such a hermetic seal, according to some example embodiments, has not been available in conventional connector seals that, for example, have a small form factor (e.g., less than 0.5 inches in height and diameter) and are also capable of high-frequency signal propagation (e.g., 40 GHz).

In this regard, according to some example embodiments, a diameter of the ribs 253 and 254 may be the same or slightly less than a diameter of the potting cup internal channel 246. As such, during assembly, the connector seal 250 may slide into the potting cup internal channel 246, with the annular seal member 251 compressed between the external surface of the connector seal 250 and the wall of the potting cup internal channel 246, until rib 254 rests against a ledge formed within the potting cup internal channel 246. Subsequently, a retaining sleeve 249 (e.g., formed of aluminum) may be slid or forced into the potting cup internal channel 246 and engage with the rib 253. The retaining sleeve 249 may be secured in place (e.g., via a wedged engagement with the wall of the internal channel 246) against the rib 253 by a retaining ring 247, which is installed in a groove on the wall of the potting cup internal channel 246.

The connector seal 250 may also comprise interconnects 255 and 256 with a conductive pin 252 passing through and extending between the interconnects 255 and 256. The interconnect 255 may be disposed adjacent to the first end 270 of the connector seal 250, and the interconnect 256 may be disposed adjacent to the second end 272 of the connector seal 250. According to some example embodiments, the interconnects 255 and 256 may be male connectors as further described below. The cable interconnect 221 that is installed on the end of cable 220 may be a corresponding connector to the interconnect 255, and, as such, according to some example embodiments, may be a female connector. Accordingly, during assembly, the female connector of cable interconnect 221 may be engaged with the male connector of interconnect 255 to form an electrical connection between the cable 220 and the connector seal 250. The interconnect 256 may be open and available for electrical connection with, for example, a bullet connector as further described herein.

Figure 3A:
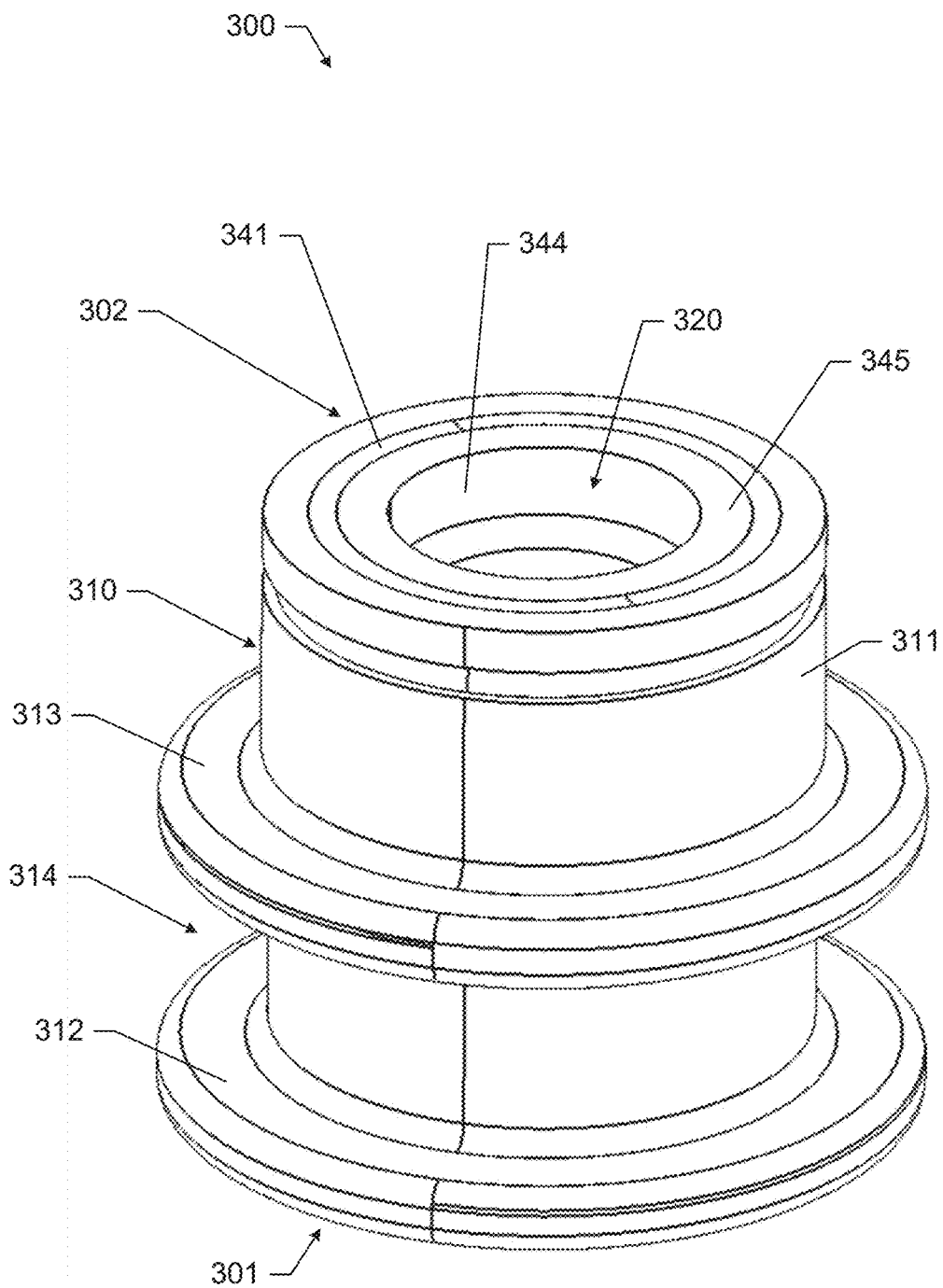
FIG. 3A is a perspective side view of a connector seal according to some example embodiments.
Figure 3B:
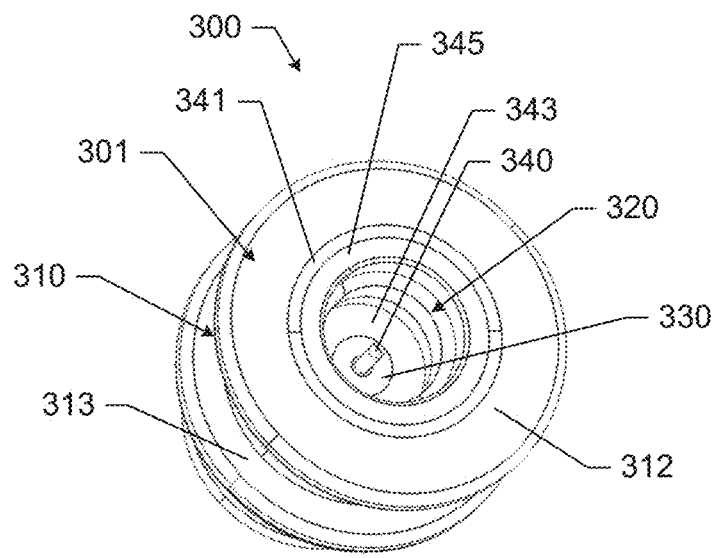
FIG. 3B is a perspective bottom view of the connector seal of FIG. 3A according to some example embodiments.
Figure 3C:
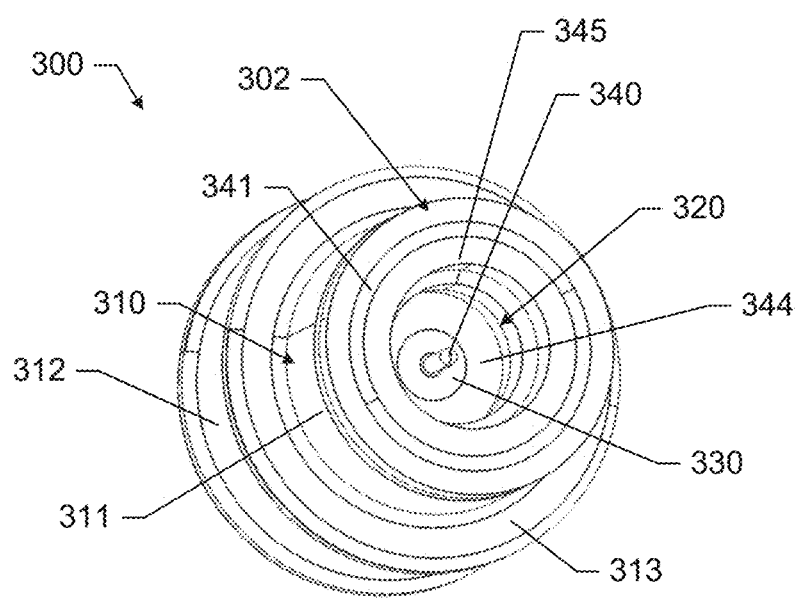
FIG. 3C is a perspective top view of the connector seal of FIG. 3A according to some example embodiments.
Figure 3D:
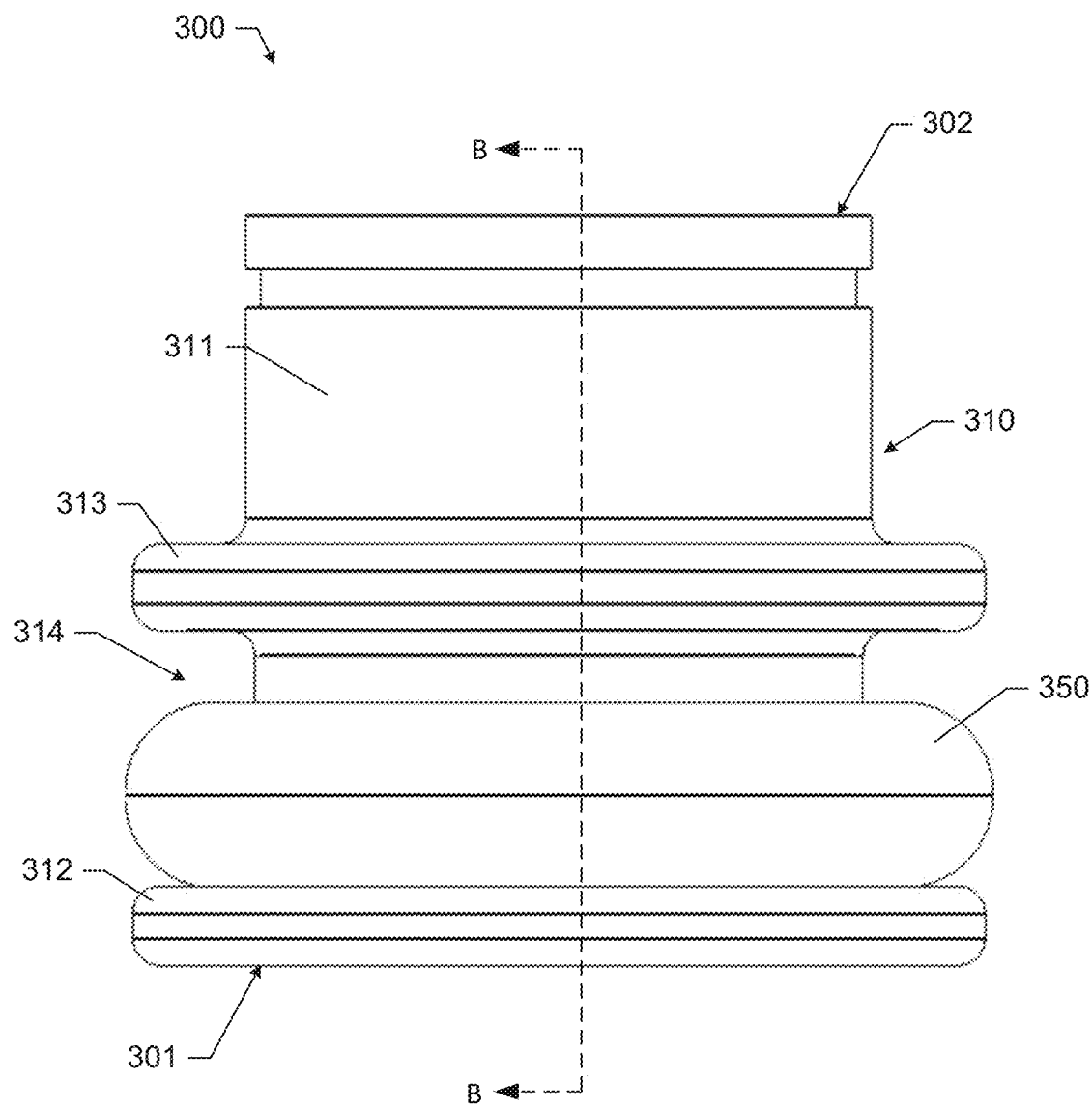
FIG. 3D is a side view of the connector seal of FIG. 3A including a annular seal member according to some example embodiments.

FIGS. 3A to 3D will now be described which provide detailed views of an example connector seal 300 in isolation from other components. FIGS. 3A to 3C illustrate the connector seal 300 without an annular seal member, while FIG. 3D illustrates the connector seal 300 with the annular seal member 350. The connector seal 300 may be the same or similar to the connector seals 113, 130, and 250 otherwise described herein. FIG. 3A provides a perspective side view of the example connector seal 300. FIG. 3B provides a perspective bottom view of the connector seal 300, and FIG. 3C provides a perspective top view of the connector seal 300. FIG. 3D provides a side view of the connector seal 300.

Referencing FIGS. 3A to 3D, the connector seal 300 may comprise a shell 310 that defines an outer surface of the connector seal 300. The shell 310 may be formed of, for example, stainless steel. The shell 310 may comprise a substantially cylindrical body 311 with an internal channel 320 that passes from a first end 301 of the connector seal 300 to a second, opposite end 302 of the connector seal 300. The shell 310 may, according to some example embodiments, have an external diameter of 0.242 inches and an internal diameter of 0.210 inches. A height of the shell 310 may, according to some example embodiments, be less than one-half inch (i.e., 0.5 inches) or about 0.285 inches. The shell 310 may comprise a first rib 312 and a second rib 313 that extend out radially from the body 311. According to some example embodiments, a diameter across the external edge of the first rib 312 or the second rib 313 may be less than one-half inch (i.e., 0.5 inches). According to some example embodiments, the diameter across the external edge of the first rib 312 or the second rib 313 may be 0.341 inches. According to some example embodiments, the ribs 312 and 313 may be ring-shaped or annular and may extend out radially from the body 311 by the same or a different distance (e.g., 0.098 inches). The ribs 312 and 313 may also have a thickness or width of 0.030 inches, which may be the same thickness or width for both ribs 312 and 313, according to some example embodiments. According to some example embodiments, the first rib 312 may be disposed adjacent to the first end 301 of the connector seal 300. The second rib 313 may be disposed between the first rib 312 and second end 302 of the connector seal 300. In this regard, the second rib 313 may be disposed 0.125 inches from the second end of the connector seal 300. Accordingly, a groove 314 may be defined between the first rib 312 and the second rib 313. Similar to the groove 248, the groove 314 may be configured to receive and maintain an annular seal member, such as annular seal member 251. The groove 314, according to some example embodiments, may be less than one tenth of an inch (i.e., 0.1 inches) in width and may, according to some example embodiments, be 0.098 or 0.093 inches in width.

Figure 3E:
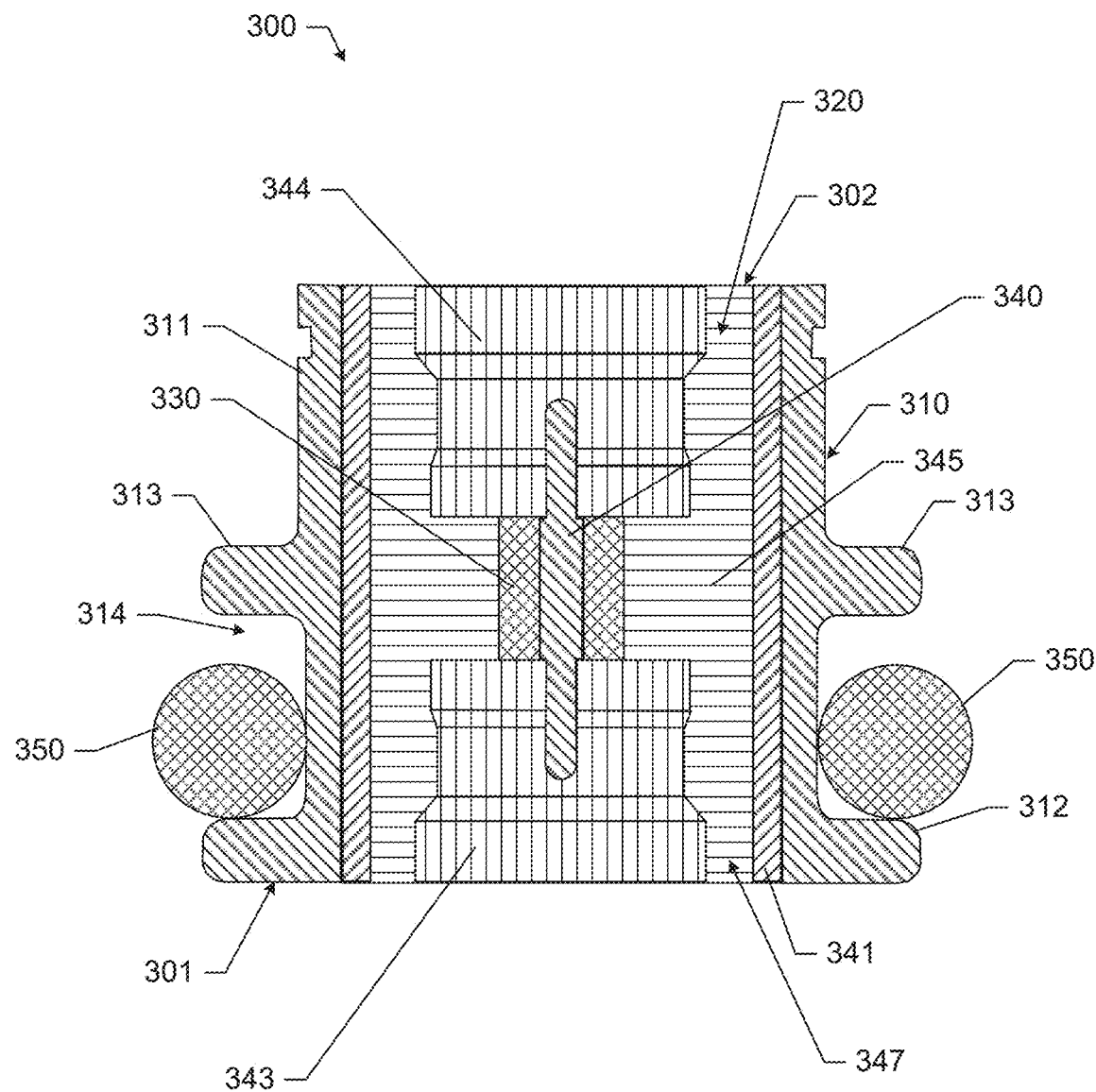
FIG. 3E is a cross-section side view of the connector seal of FIG. 3D taken at the plane defined at B-B according to some example embodiments.

A number of components, which are described in further detail with respect to FIG. 3E, are also visible in some of FIGS. 3A to 3D. In this regard, interconnect 343, adjacent the first end 301 of the connector seal 300, and interconnect 344, adjacent the second end 302 of the connector seal 300, are visible. The interconnects 343 and 344 may be push-on connectors that form a detent with a corresponding connector on another apparatus. In this regard, the interconnects 343 and 344 may comprise a cavity (i.e., be cup-shaped), but may be male connectors having the conductive pin 340 extend from a base of the cavity towards the respective end of the connector seal 300. Further, an inner shell 345 and an isolation sleeve 341 are also visible. The inner shell 345 may be formed of an insulating material and provide structural support for the interconnects 343 and 344, the dielectric sleeve 330, and the conductive pin 340. The isolation sleeve 341, as further described below, may isolate the interconnects 343 and 344 and the inner shell 345 from the wall of the internal channel 320 of the shell 310.

With reference to FIG. 3D, the annular seal member 350 may be disposed in the groove 314 formed between the ribs 312 and 313. The annular seal member 350 may have a toroidal (i.e., doughnut) shape. According to some example embodiments, a cross-section of the annular seal member 350 may be circular or rectangular. At rest and in isolation from other components, an internal diameter of the annular seal member 350 may be the same or less than an external diameter of the body 311 of the shell 310. As such, according to some example embodiments, the annular seal member 350 may have an internal diameter that is the same or less than 0.242 inches. Additionally, extend radially away from the body 311 beyond the ribs 312 and 313. As such, when installed in the groove 314, the external diameter of the annular seal member 350 may be greater than 0.098 inches. As such, because the external diameter of the annular seal member 350 extends beyond the ribs 312 and 313 radially away from the body 311, the annular seal member 350 may be compressed into the groove 314 by an external component (e.g., cable potting cup 240) to from a hermetic seal.

FIG. 3E provides a cross-section side view of the connector seal of FIG. 3D, according to some example embodiments. As depicted in FIG. 3E, the connector seal 300 comprises a shell 310, an isolation sleeve 341, an inner shell 345, a dielectric sleeve 330, a conductive pin 340, a first interconnect 343, a second interconnect 344, and an annular seal member 350.

As mentioned earlier, the shell 310 may be formed of various materials such as stainless steel. The shell 310 may include the cylindrically shaped body 311 with the internal channel 320 and the externally disposed ribs 312 and 313. The externally disposed ribs 312 and 313 form a groove 314 on the external surface of the shell 310 for receiving and maintaining the annular seal member 350.

The isolation sleeve 341 may be disposed within the internal channel 320 of shell 310. In this regard, an external diameter of the isolation sleeve 341 may be slightly less than the diameter of the internal channel 320 to allow the isolation sleeve 341 to be slid into the internal channel 320. The external diameter of the isolation sleeve 341 may be 0.210 inches and an internal diameter of the isolation sleeve 341 may be 0.185 inches. According to some example embodiments, the isolation sleeve 341 may be affixed or adhered to an inner wall of the internal channel 320 of the shell 310 via an adhesive, which may be an epoxy. The isolation sleeve 341 may be formed of a non-conductive material. In this regard, the isolation sleeve 341 may be formed of a glass or ceramic material. For example, the isolation sleeve 341 may be formed of a Corning 7070 glass or an equivalent that, for example, has a density of 2.03 to 2.11 grams per cubic centimeter and a dielectric constant of 4.1 at 20 degrees Celsius for a 1 MHz signal. Further, the isolation sleeve 341 may have an internal channel 347. The interconnect 343, the interconnect 344, the dielectric sleeve 330, and the conductive pin 340 may be disposed within the inner shell 345. The inner shell 345 may be disposed within the internal channel 347 of the isolation sleeve 341. With respect to functionality, the isolation sleeve 341 may be configured to electrically isolate the interconnects 343 and 344, and the conductive pin 340 from the shell 310. Additionally, the isolation sleeve 341 may be configured to physically isolate the interconnects 343 and 344 from the shell 310.

The conductive pin 340 may be formed of a conductive material, such as a nickel-iron-cobalt alloy, and the conductive pin 340 may be configured to make an electrical connection through the connector seal 300. The conductive pin 340 may also be nickel-plated and/or gold-plated. The conductive pin 340 may be disposed along a central axis of the connector seal 300. Additionally, the conductive pin 340 may extend between and pass into the interconnects 343 and 344 to have a portion of the conductive pin 340 disposed within each of the first interconnect 343 and the second interconnect 344. In this regard, the conductive pin 340 may extend through an opening the base of the, for example, cup-shaped interconnects 343 and 344.

In a space disposed between the first interconnect 343 and the second interconnect 344, the conductive pin 340 may pass through the dielectric sleeve 330. As such, the dielectric sleeve 330 may be disposed between the first interconnect 343 and the second interconnect 344 within the internal channel 320 of the shell 310, and more specifically, within the inner shell 345. The dielectric sleeve 330 may also include an internal channel through which the conductive pin 340 passes. According to some example embodiments, the dielectric sleeve 330 may prevent the conductive pin 340 from physically contacting the interconnects 343 and 344 by isolating the conductive pin 340 from the interconnects 343 and 344. As such, with respect to the each of the interconnects 343 and 344, the dielectric sleeve 330 may be disposed between the conductive pin 340 and the interconnects 343 and 344 at a location where the dielectric sleeve 330 physically contacts the interconnects 343 to 344 as best shown in FIGS. 3B and 3C.

The dielectric sleeve 330 may be formed of, for example, a non-conductive material or an insulator material. In this regard, for example, the dielectric sleeve 330 may be formed of a glass or ceramic material. As a dielectric, the dielectric sleeve 330 may, according to some example embodiments, function to attenuate high frequency harmonics of the signals being propagated through the conductive pin 340. According to some example embodiments, due to the operation of the dielectric sleeve 330, the isolation sleeve 341, and the material compositions of the dielectric sleeve 330 and the isolation sleeve 341, the resistance and impedance across the connector seal 300 may be minimized. Additionally, the conductive pin 340, for these same reasons, may support high radio frequency signal propagation, ranging from DC to 40 Ghz, or higher frequencies.

According to some example embodiments, the first interconnect 343 and the second interconnect 344 may have the same structure, but may be disposed on opposite ends of the connector seal 300. More specifically, the interconnect 343 (first interconnect) may be disposed within the internal channel 320 of the shell 310 at a first end 301 of the shell 310 and the interconnect 344 (second interconnect) may be disposed within the internal channel 320 of the shell 310 at a second end 302 of the shell 310. As mentioned above, the interconnects 343 and 344 may be cup-shaped with a central opening at the base of the cup through which the conductive pin 340 (and the dielectric sleeve 330) may pass. The interconnects 343 and 344 may be formed of an alloy material, such as nickel-cobalt ferrous alloy (e.g., Kovar®), a nickel-iron-cobalt alloy, or a beryllium copper alloy. According to some example embodiments, the interconnects 343 and 344 may also be plated with nickel and/or gold. Further, the interconnects 343 and 344 may be structured to be either male or female connectors. In the example embodiment of connector seal 300, the interconnects 343 and 344 are male connectors. Further, the interconnects 343 and 344 may also be push-on connectors. In this regard, the interconnects 343 and 344 may be configured to make an electrical connection via a push-on connection, or the interconnects 343 and 344 may be disconnected from external connectors by being pulled apart. In this regard, the forces required to push the interconnects 343 and 344 into a connection and the forces required to pull the interconnects 343 and 344 apart from other connectors may be referred to as detent forces. According to some example embodiments, the interconnects 343 and 344 may be sub miniature push-on (SMP) connectors that support signal propagation on the conductive pin 340 at radio frequencies and support the formation of connections via male or female detents. In this regard, no welding or soldering may be needed to form an electrical connection through the connector seal 300. Additionally, according to some example embodiments, the electrical connections made via the interconnects 343 and 344 need not require threading or otherwise be screwed together with other connectors. Rather, via the push-on connectors of the interconnects 343 and 344, electrical connections may be made with conductive pin 340 by merely applying a connecting force in excess of the detent force. Further, the interconnects 343 and 344 may include features such as slots or grooves when interacting with other external connectors.

The annular seal member 350 may be same or similar to the annular seal member 251. As described above, the annular seal member 350 may take the form of an elastic o-ring. Further, the annular seal member 350 may be disposed in the groove 314 of the shell 310 to hermetically piston seal the connector seal 300 within a submersible connection apparatus. Further, according to some example embodiments, a plurality of annular seal members 350 may be disposed in either the groove 314 or additional grooved formed via respective ribs on the exterior of the shell 310.

Figure 4:
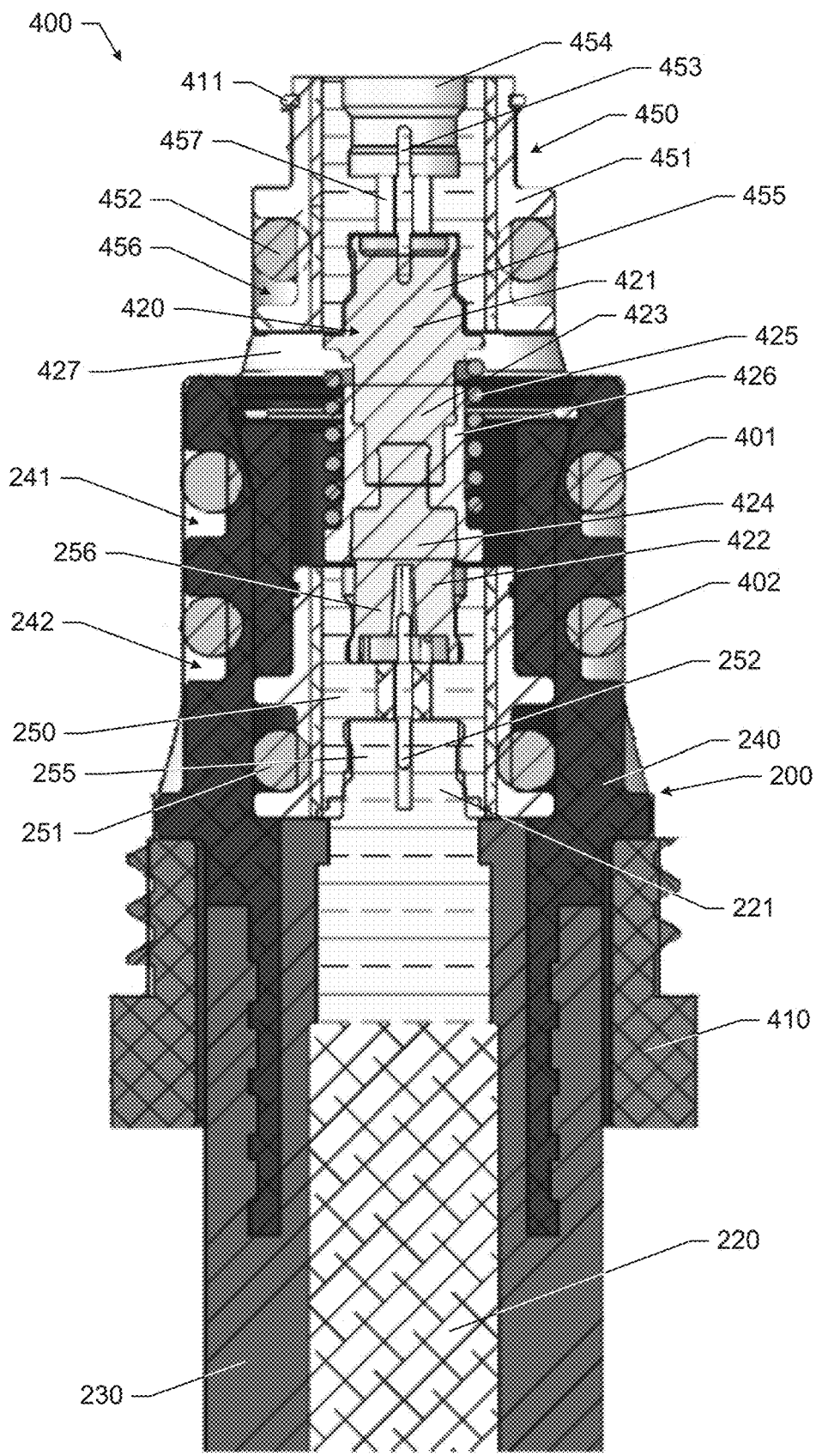
FIG. 4 is a cross-section side view of a submersible connection apparatus according to some example embodiments.

Based on the foregoing, FIG. 4 provides a cross-section side view of a submersible connection apparatus 400, according to some example embodiments. The submersible connection apparatus 400 may be a variation of the submersible connection apparatus 100 that incorporates aspects of the cable potting apparatus 200 with the connector seal 250 of FIG. 2B. However, the connector seal 250 (referred to hereinafter as the first connector seal 250) and the second connector seal 450 may be the same or similar to the connector seal 300. The second connector seal 450 may also be the same or similar to the pressure vessel connector seal 130 of FIG. 1.

The submersible connection apparatus 400 may comprise the cable 220, the cable potting apparatus 200, a bullet connector 420, and a second connector seal 450. The cable potting apparatus 200, the bullet connector 420, and the second connector seal 450 may be disposed within a pressure vessel which is not shown in FIG. 4, but may be the same or similar to the pressure vessel 120. The submersible connection apparatus 400 may be maintained in the pressure vessel via the locking collar 410, which may have a threaded engagement with a wall of the bore within the pressure vessel, and a retaining ring 411, which may engage with both a retaining ring groove in the second connector seal 450 and an external wall of the pressure vessel. The locking collar 410 may abut a protrusion on the cable potting cup 240 when assembled. Additionally, as further described herein, the annular seal members 401, 402, and 452 may engage with an internal wall of the bore of the pressure vessel to hermetically seal the submersible connection apparatus 400 within the pressure vessel.

As mentioned above, the cable potting apparatus 200 may be same as described above with respect to FIG. 2B. However, in FIG. 4, annular seal members 401 and 402 are shown as being disposed within grooves 241 and 242 respectively. The annular seal members 401 and 402 may be the same or similar to the annular seal member 251, however, with a larger internal radius for application on the exterior of the cable potting cup 240.

The bullet connector 420 may comprise a first interconnect 421, a second interconnect 422, a first body member 423, and a second body member 424, a spring 425, and an alignment sleeve 426. According to some example embodiments, the first interconnect 421 and the second interconnect 422 may be corresponding connection members configured to engage with the interconnect 256 of first connector seal 250 and interconnect 455 of second connector seal 450. The first interconnect 421 and the second interconnect 422 of the bullet connector 420 may be push-on connectors such as SMP connectors. Additionally, according to some example embodiments, the first interconnect 421 and the second interconnect 422 may be female connectors that may be configured to interface with the male connectors of the interconnect 256 and the interconnect 455.

A first body member 423 of the bullet connector 420 may be affixed to or integrated with the first interconnect 421. The first body member 423 may extend from the first interconnect 421 and include an internal channel configured to receive a portion of the second body member 424. The second body member 424, in this regard, may be affixed to or integrated with the second interconnect 422. The second body member 424 may extend from the second interconnect 422 and include a protrusion that is smaller than the internal channel of the first body member 423. The protrusion of the second body member 424 may be inserted into the internal channel of the first body member 423. While the alignment sleeve 426 may maintain first body member 423 in engagement with the second body member 424, because the protrusion of the second body member 424 can be smaller than the internal channel of the first body member 423, the first body member 423 may be able to pivot and translate relative to the second body member 424. Due to this relative movement feature of the bullet connector 420, the bullet connector 420 may allow for some degree of misalignment (i.e., radial or axial misalignment) between interconnect 455 of the second connector seal 450 and the interconnect 256 of the first connector seal 250 and still maintain a quality electrical connection between the first connector seal 250 and the second connector seal 450. Additionally, to apply an outward pressure on each of the first interconnect 421 and the second interconnect 422, spring 425 may be disposed between the alignment sleeve 426 (which may be affixed to the second body member 424) and the first body member 423. As such, when the submersible connection apparatus 400 is installed in the pressure vessel, the spring 425 may be compressed and thereby apply a constant force to maintain the connections of the bullet connector 420 between the first connector seal 250 and the second connector seal 450. In this manner, the bullet connector 420 may be a spring-loaded radio frequency bullet connector.

As such, the first interconnect 421 of the bullet connector 420 may be engaged with the interconnect 455 of the second connector seal 450 and the second interconnect 422 of the bullet connector 420 may be engaged with the interconnect 256 of the first connector seal 250 to from an electrical connection from the cable 220 to the second connector seal 450. The second connector seal 450 may be included in the submersible connection apparatus 400 to act as a barrier to seawater or other environmental fluids and prevent the sea water or other environmental fluids from penetrating into the connection chamber where the bullet connector 420 is disposed, when the submersible connection apparatus 400 is assembled as shown in FIG. 4.

As such, the second connector seal 450 may be coupled to the cable potting apparatus 200 via an engagement collar 427 and the force applied on the second connector seal 450 by the pressure vessel and the threaded locking collar 410. Similar to the first connector seal 250, the second connector seal 450 comprises a shell 451 having ribs that form a groove 456 for receiving an annular seal member 452. The annular seal member 452 may be same or similar to the annular seal member 251. However, due to the placement of the second connector seal 450, the annular seal member 452 may form a hermetic piston seal between the shell 451 and the interior wall of a bore in the pressure vessel.

Additionally, the second connector seal 450 may comprise the interconnect 454 and the interconnect 455. Similar to the interconnects of the first connector seal 250, the interconnects 454 and 455 may be male push-on connectors (e.g., SMP connectors). A conductive pin 453 may extend from the interconnect 455 to the interconnect 454, and may be isolated from the interconnects 454 and 455 by a dielectric sleeve 457. Accordingly, with the submersible connection apparatus 400 assembled into the pressure vessel, further connections to other cables or devices may be made via engagement with the interconnect 454 to create an electrical connection to the conductive pin 453, and ultimately to the conductor of the cable 220.

Figure 5:
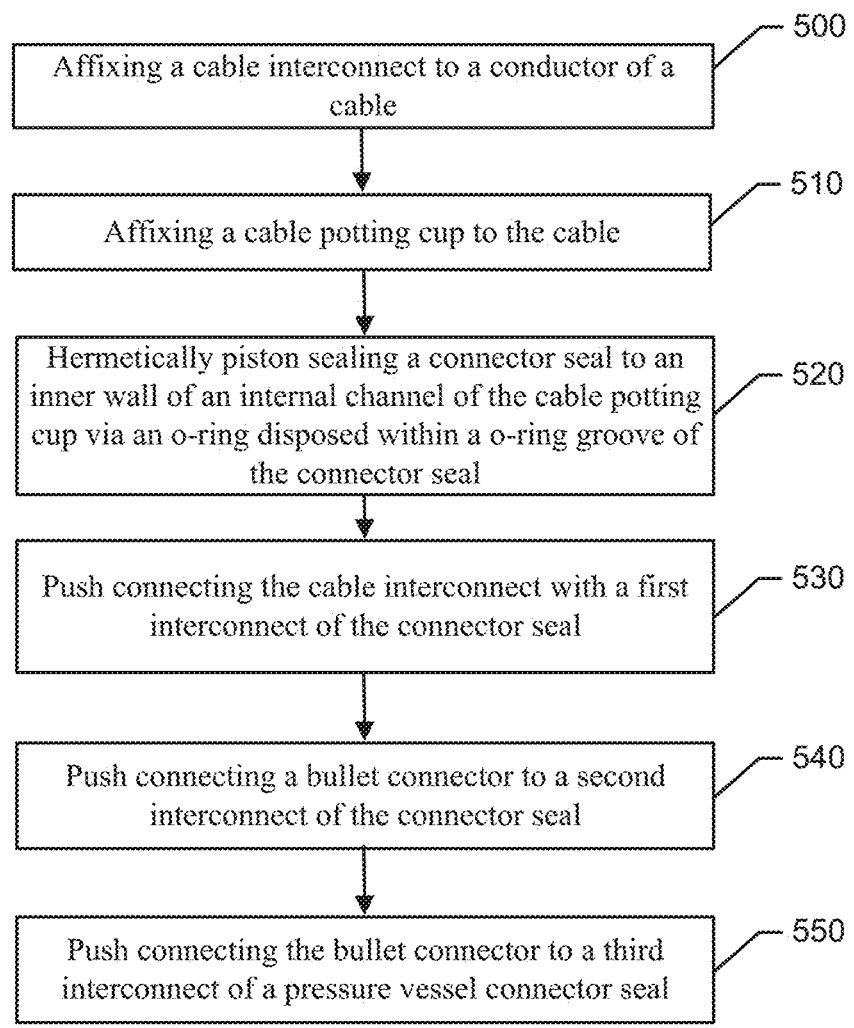
FIG. 5 is a flowchart of a method for assembling a submersible connection according to some example embodiments.

Now referring FIG. 5, a flowchart of a method for assembling a submersible connection is shown. According to some example embodiments, the example method may comprise, at 500, affixing a cable interconnect to a conductor of a cable. According to some example embodiments, the cable interconnect that is connected to the cable may be a radio frequency push-on connector, which may, for example, form a female detent connector member. Additionally, the example method may comprise, at 510, affixing a cable potting cup to the cable. Further, the example method may comprise, at 520, hermetically piston sealing a connector seal to an inner wall of an internal channel of the cable potting cup via an annular seal member disposed within a groove of the connector seal. Additionally, the example method may comprise, at 530, push connecting the cable interconnect with a first interconnect of the connector seal. According to some example embodiments, the first interconnect of the connector seal may be a push-on radio frequency connector that forms a male detent connector.

Additionally, according to some example embodiments, the example method may comprise, at 540 push connecting a bullet connector to a second interconnect of the connector seal. According to some example embodiments, the second interconnect of the connector seal may be a push-on radio frequency connector that forms another male detent connector. According to some example embodiments, the example method may also comprise push connecting the bullet connector to a third interconnect of a pressure vessel connector seal. In this regard, the pressure vessel connector seal may be disposed within a pressure vessel.

In some embodiments of the example methods described above, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments.

The embodiments presented herein are provided as examples and therefore the disclosure is not to be limited to the specific embodiments disclosed. Modifications and other embodiments are intended to be included within the scope of the appended claims. Moreover, although the foregoing descriptions and the associated drawings describe example embodiments in the context of certain example combinations of elements and/or functions, different combinations of elements and/or functions may be used to form alternative embodiments. In this regard, for example, different combinations of elements and/or functions other than those explicitly described above are also contemplated. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments.

That which is claimed:

1. A connector seal for use in a submersible connection apparatus, the connector seal comprising:
    a shell comprising an internal channel and a groove disposed on an external surface of the shell;
    an annular seal member disposed in the groove of the shell, the annular seal member being configured to hermetically piston seal the connector seal within the submersible connection apparatus;
    a first interconnect disposed within the internal channel at a first end of the shell;
    a second interconnect disposed within the internal channel at a second end of the shell;
    a conductive pin configured to make an electrical connection through the connector seal, the conductive pin extending between and disposed within the first interconnect and the second interconnect;
    a dielectric sleeve disposed within the internal channel of the shell between the first interconnect and the second interconnect; and
    an isolator sleeve disposed within the internal channel of the shell.

2. The connector seal of claim 1 wherein:
    the conductive pin passes through an internal channel of the dielectric sleeve; and the dielectric sleeve isolates the conductive pin from the first interconnect and the second interconnect.

3. The connector seal of claim 1, wherein the dielectric sleeve is formed of a glass material or a ceramic material.

4. The connector seal of claim 1 wherein:
the first interconnect, the second interconnect, and the conductive pin are disposed within an internal channel of the isolator sleeve; and
the isolator sleeve is configured to electrically isolate the first interconnect, the second interconnect, and the conductive pin from the shell.

5. The connector seal of claim 1 wherein the isolator sleeve is adhered to an inner wall of the internal channel of the shell by an epoxy.

6. The connector seal of claim 1 wherein the isolator sleeve is formed of a glass material or a ceramic material.

7. The connector seal of claim 1, wherein the first interconnect comprises a first male connector and the second interconnect comprises a second male connector.

8. The connector seal of claim 1, wherein the first interconnect and the second interconnect are radio frequency (RF) push-on connectors.

9. The connector seal of claim 4:
wherein the conductive pin passes through an internal channel of the dielectric sleeve.

10. The connector seal of claim 1, wherein the conductive pin is configured to transmit signals through the connector seal at frequencies up to 40 gigahertz.

11. The connector seal of claim 1 wherein the hermetic piston seal formed between the annular seal member and the submersible connection apparatus is maintained to pressures up to 1500 pounds per square inch.

12. The connector seal of claim 1, wherein the groove is formed by a first rib and a second rib, wherein the first rib is disposed at the first end of the shell.

13. The connector seal of claim 12, wherein the first rib is annular, and a diameter of the first rib is less than 0.5 inches.

14. A submersible connection apparatus comprising:
a cable comprising a conductor;
a cable interconnect affixed to an end of the cable and configured to permit an electrical connection with the conductor;
a cable potting cup comprising a potting cup internal channel; and
a connector seal disposed within the potting cup internal channel, the connector seal comprising:
a shell comprising an internal channel and a groove disposed on an external surface of shell;
an annular seal member disposed in the groove of the shell, the annular seal member being configured to hermetically piston seal the connector seal to an inner wall of the potting cup internal channel;
a first interconnect disposed within the internal channel of the shell at a first end of the shell;
a second interconnect disposed within the internal channel of the shell at a second end of the shell;
a conductive pin configured to make an electrical connection through the connector seal, the conductive pin extending between and disposed within the first interconnect and the second interconnect; and
a bullet connector, the bullet connector being electrically connected to the conductive pin via a push-on connection between the bullet connector and the second interconnect;
wherein an electrical connection between the conductor of the cable and the conductive pin is formed via a push-on connection between the cable interconnect and the first interconnect.

15. The submersible connection apparatus of claim 14 further comprising a pressure vessel comprising a pressure vessel connector seal disposed within a bore in the pressure vessel, the pressure vessel connector seal comprising:
a second shell comprising a second internal channel and a second groove disposed on an external surface of the second shell;
a second annular seal member disposed in the second groove of the second shell, the second annular seal member being configured to hermetically piston seal the pressure vessel connector seal to an interior wall of the bore in the pressure vessel;
a third interconnect disposed within the second internal channel at a first end of the second shell;
a fourth interconnect disposed within the second internal channel at a second end of the second shell; and
a second conductive pin configured to make an electrical connection through the pressure vessel connector seal, the second conductive pin extending between and disposed within the third interconnect and the fourth interconnect;
wherein an electrical connection between the bullet connector and the second conductive pin is formed via a push-on connection between the bullet connector and the third interconnect.

16. The submersible connection apparatus of claim 14, wherein the connector seal further comprises an isolator sleeve disposed within the internal channel of the shell, the first interconnect, the second interconnect, and the conductive pin being disposed within an internal channel of the isolator sleeve;
wherein the isolator sleeve is configured to electrically isolate the first interconnect, the second interconnect, and the conductive pin from the shell.

17. The submersible connection apparatus of claim 14, wherein the groove is formed by a first rib and a second rib, wherein the first rib is disposed at the first end of the shell.

18. A method for assembling a submersible connection comprising:
affixing a cable interconnect to a conductor of a cable;
affixing a cable potting cup to the cable;
hermetically piston sealing a connector seal to an inner wall of an internal channel of the cable potting cup via an annular seal member disposed within a groove of the connector seal;
push connecting the cable interconnect with a first interconnect of the connector seal
push connecting a bullet connector to a second interconnect of the connector seal; and
push connecting the bullet connector to a third interconnect of a pressure vessel connector seal, the pressure vessel connector seal being disposed within a pressure vessel.

* * * * *